United States Patent
Ozanne et al.

(10) Patent No.: US 9,010,237 B2
(45) Date of Patent: Apr. 21, 2015

(54) IDENTIFICATION OF BEVERAGE INGREDIENT CONTAINING CAPSULES

(75) Inventors: Matthieu Ozanne, Champanges (FR); Didier Vuagniaux, Gimel (CH)

(73) Assignee: Nestec S.A., Vevey (CH)

( * ) Notice: Subject to any disclaimer, the term of this patent is extended or adjusted under 35 U.S.C. 154(b) by 2 days.

(21) Appl. No.: 13/518,305

(22) PCT Filed: Dec. 20, 2010

(86) PCT No.: PCT/EP2010/070269
§ 371 (c)(1),
(2), (4) Date: Jun. 21, 2012

(87) PCT Pub. No.: WO2011/076750
PCT Pub. Date: Jun. 30, 2011

(65) Prior Publication Data
US 2012/0260805 A1 Oct. 18, 2012

(30) Foreign Application Priority Data
Dec. 21, 2009 (EP) .................................... 09180071

(51) Int. Cl.
*A47J 31/40* (2006.01)
*A47J 31/36* (2006.01)
*A47J 31/44* (2006.01)

(52) U.S. Cl.
CPC .......... *A47J 31/3623* (2013.01); *A47J 31/4492* (2013.01)

(58) Field of Classification Search
CPC ..... A47J 31/02; A47J 31/047; A47J 31/0642; A47J 31/3614; A47J 31/3623; A47J 31/4492; A47J 31/52; A47J 31/56; A47J 2031/0694
USPC ....... 99/280, 281, 282, 283, 285, 289 R, 295; 426/77, 87, 115, 232, 383, 394
See application file for complete search history.

(56) References Cited

U.S. PATENT DOCUMENTS

| 6,392,176 B1 | 5/2002 | Tsai |
| 2002/0048621 A1 | 4/2002 | Boyd et al. |

(Continued)

FOREIGN PATENT DOCUMENTS

| EP | 1593329 A1 | 11/2005 |
| JP | 57150422 | 9/1982 |

(Continued)

OTHER PUBLICATIONS

International Search Report issued Mar. 3, 2011 for corresponding Intl. Appln. No. PCT/EP2010/070269.

(Continued)

*Primary Examiner* — Dana Ross
*Assistant Examiner* — Brandon Harvey
(74) *Attorney, Agent, or Firm* — K&L Gates LLP

(57) ABSTRACT

The invention concerns a beverage production system comprising beverage ingredient containing capsules (1) comprising an identification member (6) and a beverage production machine for receiving said capsules, said machine comprising contact means (8) for physically contacting the capsule identification member (6) in order to read information thereof and control means connected to the contact means and designed to control the operation of the beverage production machine (11) in response to the read information, the contact means (8) comprising:—at least one displaceable probe (81) which mechanically contacts the capsule identification member (6),—a resilient support member (82) in contact with the probe on one side and associated to a circuitry (9) on its other side, wherein the part of the resilient support member in contact with the probe presents such a shape that it is able to deform itself when the probe applies a force on it, the deformation being partially transversal to the direction applied by the force.

12 Claims, 6 Drawing Sheets

(56) References Cited

U.S. PATENT DOCUMENTS

2008/0296134 A1 * 12/2008 Hattori et al. ............. 200/302.1
2008/0302251 A1 * 12/2008 Rijskamp et al. ............. 99/295

FOREIGN PATENT DOCUMENTS

| JP | 2001043768 | 2/2001 |
| JP | 2004342601 | 12/2004 |
| WO | 01/58786 A1 | 8/2001 |
| WO | 2008/090122 A2 | 7/2008 |
| WO | WO2008090122 A2 * | 7/2008 | ............. A47J 31/40 |

OTHER PUBLICATIONS

Written Opinion issued Jun. 26, 2012 for corresponding Intl. Appln. No. PCT/EP2010/070269.

Japanese Office Action for Application No. P2012-543845, Dispatch No. 443427, dated Aug. 19, 2014, 9 pages.

* cited by examiner

IDENTIFICATION OF BEVERAGE INGREDIENT CONTAINING CAPSULES

CROSS REFERENCE TO RELATED APPLICATIONS

The present application is a National Stage of International Application No. PCT/EP2010/070269, filed on Dec. 20, 2010, which claims priority to European Patent Application No. 09180071.4, filed on Dec. 21, 2009, the entire contents of which are being incorporated herein by reference.

The present invention relates to the identification of a capsule by a beverage production machine.

WO 2008/090122 describes a beverage ingredient capsule that is provided with an identification member designed for being physically contacted from outside in order to control operation parameters of an associated beverage production machine. The identification member presents holes or recesses that correspond to a binary code state (0 or 1). Preferably the identification member is not visible from outside as it is covered by cover means. The beverage production machine comprises displaceable probe that can penetrate, deform, displace the cover means at regions susceptible to present holes or recesses. The degree of displacement of the probes in response to its contact with a hole or a recess is associated with information concerning the capsule. The displaceable probes are resiliably positioned at a distance of a circuitry of the machine control means and are selectively moved into contact with said circuitry depending on their contact with the recesses or the holes. The contact of the probe and circuitry also constitutes a binary code (0 or 1). The displaceable probes are resiliably positioned at a distance of the circuitry trough a resilient support member associated to the circuitry for both providing the elasticity to the probe to enable its return into a non-contact position and the insulation of the circuitry from the humidity coming from the capsule. The resilient support member can be an elastomeric, preferably silicone member. The probes can be formed of pins which have a base embedded or inserted in a seat of the support member. The control means can be designed to control, in response to the read information, a beverage production condition such as for example the temperature of a liquid supplied to the interior of the capsule.

Usually the identification member is moved and pressed against the probes by a manual movement in which the customer closes the capsule cage after he has introduced the capsule inside. When implementing the capsule and the machine such as described above, it has been observed that a variable force was necessary to transfer the information carried by the capsule identification member depending if this member wears a lot of holes or not (or a lot of recesses or not). If the capsule identification member presents a surface with few holes or a lot of recesses—according to the use of the holes or recesses configuration—an important force is needed to capture all these information and sometimes the capsule identification member can fold up during the identification phase. Yet if a capsule identification member presents a surface with a lot of holes or few recesses, a weaker force is applied on this member, yet the machine must be able to sense all these holes or absence of recesses even if the force is weaker.

A problem to solve is then to provide a machine that is able to read as well a capsule identification member presenting a surface with a lot holes (or few recesses) or with few holes (or a lot of recesses) without making sensing error either in one case or in the other.

Another problem is to be able to apply an important force on the capsule identification member without folding it.

According to a first aspect, the invention concerns a beverage production system comprising beverage ingredient containing capsules comprising an identification member and a beverage production machine for receiving a capsule, said machine comprising contact means for physically contacting the capsule identification member in order to read information thereof and control means connected to the contact means and designed to control the operation of the beverage production machine in response to the read information, the contact means comprising:

at least one displaceable probe which mechanically contacts the capsule identification member, a resilient support member in contact with the probe on one side and associated to a circuitry on its other side, wherein the part of the resilient support member in contact with the probe presents such a shape that it is able to deform itself when the probe applies a force on it, the deformation being partially transversal to the direction applied by the force.

In the system of the present invention the capsule is provided with an identification member designed for being physically contacted from outside. Thus the identification members code the information in a structural manner (in contrast to a visual bar code). More precisely, the identification member can comprise a plurality of predetermined localized contact surface receivers, each of them constituting a choice amongst two different surface levels that correspond upon a contact being established or not, with an external probe member, a binary code state (0 or 1). A surface level can correspond, for example, to a difference in depth or height of a plurality of localized recesses/holes or protruding members. In an embodiment, first and second contact receivers are provided. First contact receivers can be holes or recesses of a same depth whereas second contact receivers are holes or recesses of shorter depth or, alternatively, are filled or slightly in relief. In a possible variant, first contact receivers are protruding elements of same height whereas second contact receivers are protruding elements of greater height. Preferably the identification member is not visible from outside and is not exposed to the exterior before being physically contacted by associated probe means of the beverage production machine. To this regard the identification member can be covered to the outside by cover means, wherein the cover means and/or the identification member are designed to be transferable from a cover state to an identification reading state, e.g. by being penetrated, deformed, displace by probe means from an associated beverage production machine. Preferably the identification member is coded by modulating a surface structure of a face of the capsule, e.g. by providing holes or recesses in an identification face of the capsule. The identification face of the capsule can be covered by a displaceable, deformable or puncturable membrane such as a plastic layer, an aluminium layer or a laminate of plastic-aluminium. The cover thus is designed to be selectively perforated from outside or deformed at portions overlapping the recessions or holes. On the other hand, the cover can resist at least a certain penetration or deformation by being supported at regions which are not overlapping recessions or holes. Alternatively also the cover member can remain unchanged, but the identification member can be manipulated (e.g. displaced) in order to transfer the capsule from the identification-cover state to the identification-reading state. In a preferred embodiment, the identification member can be formed in the front of a lid of the capsule which is associated to a cup-shaped body of the capsule to demarcate a cavity containing beverage forming ingredients. The identification member can be formed as an integral part of the lid. For instance, the lid can be made of a moulded plastic onto which the identification means are moulded. For limiting the space required for the detection system, the plurality of predetermined localized contact receivers can be arranged on the front of the lid in a non-linear pattern. For instance, the receivers can be grouped in a substantially polygonal, star-shaped or curved pattern or a non-regular substantially closed pattern covering the surface of the lid.

According to the invention, the beverage production machine is designed for use with the hereabove beverage ingredient containing capsule. The beverage production machine is equipped with means for physically contacting the capsule in order to read information thereof. Further on, the beverage production machine is provided with control means which are connected with the contact means and are designed to control operation parameters of the beverage production machine in response to the read information.

The contact means comprise at least one displaceable probe which mechanically contacts the capsule identification member. The control means are initially arranged with the at least one probe to detect an identification information in relation to the degree of displacement of the probe in response of its contact with the capsule identification member. More particularly, the at least one displaceable probe is resiliably positioned at a distance of a circuitry of the control means and is selectively moved into contact with said circuitry depending on its contact with the capsule wherein the contact of the probe and circuitry constitutes a predetermined binary coded state (0 or 1) and the non-contact of the probe and circuitry constitutes the other binary coded state.

The probes can further be formed of pins which have a base. The base is preferably resting on the resilient support member. The tip of the probe can aim at piercing the cover overlying the identification member. The contact means comprise a plurality of identical displaceable pins for contacting a plurality of predetermined localized contact receivers of the capsule. Usually the at least one displaceable probe is a pin. Preferably the pin presents a bevelled sharp end. This configuration enables an easier perforation of the cover when the identification member is recovered.

The contact means also comprises a resilient support member that is in contact with the at least one probe on one side and that is associated to a circuitry on its other side. This resilient support member provides the elasticity to the probe to enable its return into a non-contact position and the insulation of the circuitry from the humidity coming from the capsule. The resilient support member can be, for instance, an elastomeric member, preferably made of silicone or of an EPDM rubber (ethylene propylene diene monomer). Since the resilient support member is associated to a circuitry on its other side, the displacement of the probe can be made such that it selectively opens an associated contact of a circuitry of the control means. In order to significantly reduce the size of the identification system, the identification circuitry can be a printed circuitry. The printed circuitry can be of a width of a few millimeters only and inserted in a small space of the machine adjacent the housing of the capsule. For instance, thickness of the printed circuitry is of 0.5 to 3 mm. The printed circuitry comprises for instance, a plurality of printed circuits which are selectively closed or opened by a plurality of the probes to provide the coded state.

According to the invention, the part of the resilient support member in contact with the probe presents such a shape that it is able to deform itself when the probe applies a force on it, the deformation being partially transversal to the direction applied by the force. Preferably the part of the resilient support member in contact with the probe presents such a shape that when the probe applies a force on it, it firstly deforms itself along a direction longitudinal to the force applied by the probe and it secondly deforms itself along a direction transversal to the direction applied by the force.

Due to this partial transversal deformation of the part of the resilient support member in contact with the probe, an important force can be applied through the probes on the resilient support member without folding the capsule identification member: actually the more important is the force, the more important is the transversal deformation of the resilient support member. This transversal deformation absorbs a part of the force which avoids the folding of the capsule identification member.

When a weaker force is applied on the resilient support member because it presents more holes (or less recesses) then the parts of the resilient support member facing the absence of holes (or the presence of recesses) deform themselves at least longitudinally along the direction applied by the force so that they contact the circuitry.

If the contact means of the machine comprises several probes, then each part of the resilient support member in contact with each probe presents the same shape able to partially transversally deform itself.

According to the preferred mode, the side of the part of the resilient support member in contact with the probe presents the form of a hollowed cylinder and the other side of said part of the resilient support member associated to the circuitry presents the form of a cone. Preferably the resilient support member is a sheet:
   on which the hollowed cylinder protrudes on the side of the resilient support member in contact with the probe and
   in which the cone is hollowed out on the other side of the resilient support member associated to the circuitry. It is preferred that the cone and the hollowed are attached to the sheet in such a manner that they can easily recover their initial shape and position as soon as a force is no more applied on them. For this reason, at the level of the connection of the hollowed cylinder and the cone, the sheet is preferably inclined or leant in direction of the hollowed cylinder.

Usually the contact means comprises conductive means between the resilient support member and the circuitry. The conductive means can comprise discrete conductive parts fixed on a layer placed between the resilient support member and the circuitry. The discrete conductive parts are preferably fixed on the side of the layer facing the circuitry, more preferably the discrete conductive parts face the areas of the circuitry which can be short-circuited.

According to a first mode, the layer is made of an elastomeric member, preferably a silicone or an EPDM rubber, and the electrical conductive parts are made of graphite. Such a layer presents the advantage of isolating the circuitry from the humidity that can be generated in the capsule.

According to a second mode, the layer is a film, the discrete electrical conductive pieces being stuck on said film and a waterproof material layer being placed between the resilient support member and the layer. In this second mode the film can be a simple plastic film that eventually presents some small holes for letting air passes through. The waterproof material layer can be selected in the list of laminates of PET/aluminium/PP, PE/EVOH/PP, PET/Metallised/PP, aluminium/PP.

The control means is designed to control, in response to the read information, a beverage production condition such as for example the temperature of a liquid supplied to the interior of the capsule. The contact means can comprise a plurality of displaceable pins forming a predetermined pattern which mechanically selectively contact the predetermined localized surface receivers of the capsule. The control means can be designed to detect the identification information via the degree of displacement of the pin against the capsule. Preferably the control means is designed to control a beverage production temperature and/or a brewing pause time in response to the read information. In particular, the control means are designed to vary water temperature parameters, flow rate and/or brewing pause time in the brewing of different brewed tea beverages according to capsules containing leaf tea ingredients having different characteristics and/or origins.

The beverage production machine can be designed to produce tea, coffee and/or other beverages

BRIEF DESCRIPTION OF THE DRAWINGS

The characteristics and advantages of the invention will be better understood in relation to:

Generally it is an aspect of the present invention that a beverage production machine 11 is designed to produce a beverage from a capsule 1 positioned at a dedicated beverage production position of the beverage production machine 11. As shown in FIG. 1 the capsule has a dedicated compartment for containing beverage ingredients 5. A liquid 3, controlled by a control unit 10 of the beverage production machine 11, is made to enter the capsule 1 in order to interact with the ingredients 5 contained therein. The result of the interaction, i.e. a produced beverage or liquid comestible, can then be obtained 4 from the beverage production machine 11. Typical examples for the nature of the interaction between the liquid 3 and the ingredients 5 are brewing, mixing, extracting, dissolving etc. Different types of ingredients can be present in the beverage compartment and different types of interactions can take place in the capsule. The system as shown in FIG. 1 is provided with means for retrieving ("reading") identification data from the capsule 1 in order to transfer the read identification data to the control unit 10, such that the control unit 10 can control the operation of a following production cycle of the beverage production machine 11 depending on the content of the read identification data. The identification data can refer to parameters of the capsule and/or the ingredients. The capsule 1 according to the present invention is provided with an identification member 6 which carries, in a coded manner, identification information. Preferably the information is coded by a modulation of the surface structure of a face of the capsule 1. e.g. a hole or a recession can represent one logical sate (e.g. "0"), while another surface state ("no recession" or "no hole") can represent the other logical state (e.g. "1"). Preferably the identification member 6 is arranged at the capsule 1 such that it is not exposed to and usually not visible from outside. To this regard a cover 7 can be provided for the identification member 6. The cover 7 serves for aesthetic and/or protective purposes with regard to the identification member 6. The cover 7 and the identification member 6 are part of the capsule and arranged such that at the beginning the identification member is in a protected state. Contact means 8 of the beverage production machine can then manipulate the system cover means/identification member such that the system cover means/identification member is transferred from a covered state to an identification reading state in which the probe means can read visually or through mechanical contact the information encoded in the identification member. The manipulation can take place with regard to the identification member 6 and/or the cover means 7. Preferably the cover 7 is only carrying out the complete covering function as long as no detection process has been carried out. Along with the detection process, as will be explained later on, the cover 7 can be e.g. at least partially removed, displaced, deformed or perforated. Alternatively the cover 7, during the information reading process, is deflected in order to follow the surface contours of the identification member arranged below the cover. To this regard a flexible cover 7 can be foreseen which can be deflected from outside in order to read the surface structure of the identification member 6 arranged below the cover 7. The beverage production machine 11 is provided with contact means 8 which are designed to read the information coded by modulating the surface structure of the identification member 6. Preferably such detection is carried out by means of a physical mechanical contact. To this regard the contact means 8 can preferably comprises a plurality of displaceable pins 81, which during the information reading process are biased against the identification member 6 of the capsule 1. Depending on the specific shape of the surface structure of the identification member 6 at the contact area between a pin 81 in the identification member 6, a pin 81 will thus be allowed to protrude more or less towards the capsule 1.

Figure 1:
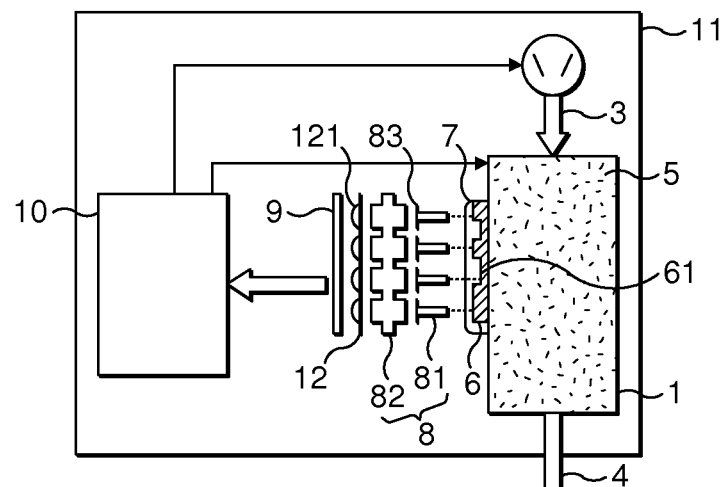
FIG. 1 showing a schematic overview of a system according to the present invention designed for reading identification information from a beverage ingredient containing capsule.

The pins 81 are isolated from an electronic circuitry board 9 by means of a resilient support member 82 preferably made of an electrically isolating material layer, such as e.g. silicone. This member 82 will thus provide the necessary biasing force in order to slightly press the pins 81 towards the capsule and eventually perforate or deform any cover provided on top of the identification member of the capsule. Each pin 81 can be provided with a flange 83 which is in contact with a part of the support member 82. The pins are preferably more rigid than the resilient support member 82. The pins can be made of metal or hard plastic. The relative displacement of the pins 81 is transmitted to a resilient support member 82 in contact with the pins 81 on its front side. The resilient support member 82 is associated on its back side to a circuitry 9. The mechanical displacement of the pins is then converted into electronic signals. The thus generated electrical detection signals can then be processed by the control unit 10. The control unit 10 will then set, as a function of the read identification data from the capsule, parameters of the beverage production process, such as for example (non-exhaustive list) the flow rate and temperature of the supplied liquid 3 as well as the interaction time etc.

In the state shown in FIG. 1 only one depicted pin 81 faces a hole 61 of the identification member 6. Thus during the reading this specific pin is not pushed rearwards and thus not activating electrical micro-switches designed to selectively produce electrical short circuits of dedicated portions of a printed circuit board 9. On the contrary the three other pins do not face holes in the identification member 7 and then are not allowed to further slide into the surface structure of the identification member 7, they will thus be slightly pushed rewards (to the left inside FIG. 1) thus pushing the parts of the resilient support member 82 silicone material in contact with their flanges 83 to activate (i.e. transfer in the conducting state) an electrically conducting micro switch towards the printed circuit board 9. To this regard conductive means 12, 121 can be inserted between the resilient support member 82 and the printed circuit board 9 which can selectively produce a defined short circuit on the printed circuit board 9, the defined short circuit corresponding to closing a switch. In FIG. 1, the illustrated conductive means is layer 12, for example made of silicone, and the side of said layer 12 facing the printed circuit board 9 presents electrical conductive parts 121 at the places facing the deformable parts of the resilient support member 82 and the areas of the printed circuit board 9 which can be short-circuited.

Figure 2:
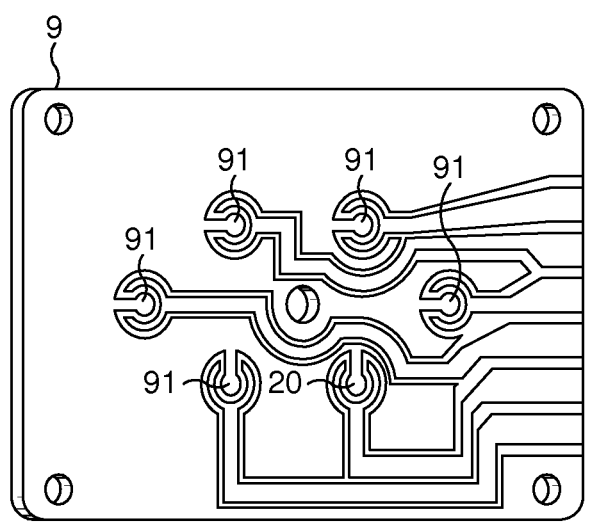
FIG. 2 showing a printed circuit board which can be associated with the probe means.

FIG. 2 shows more details of the printed circuit board 9. The reference numeral 91 designates those areas which can be selectively short-circuited.

Figure 3:
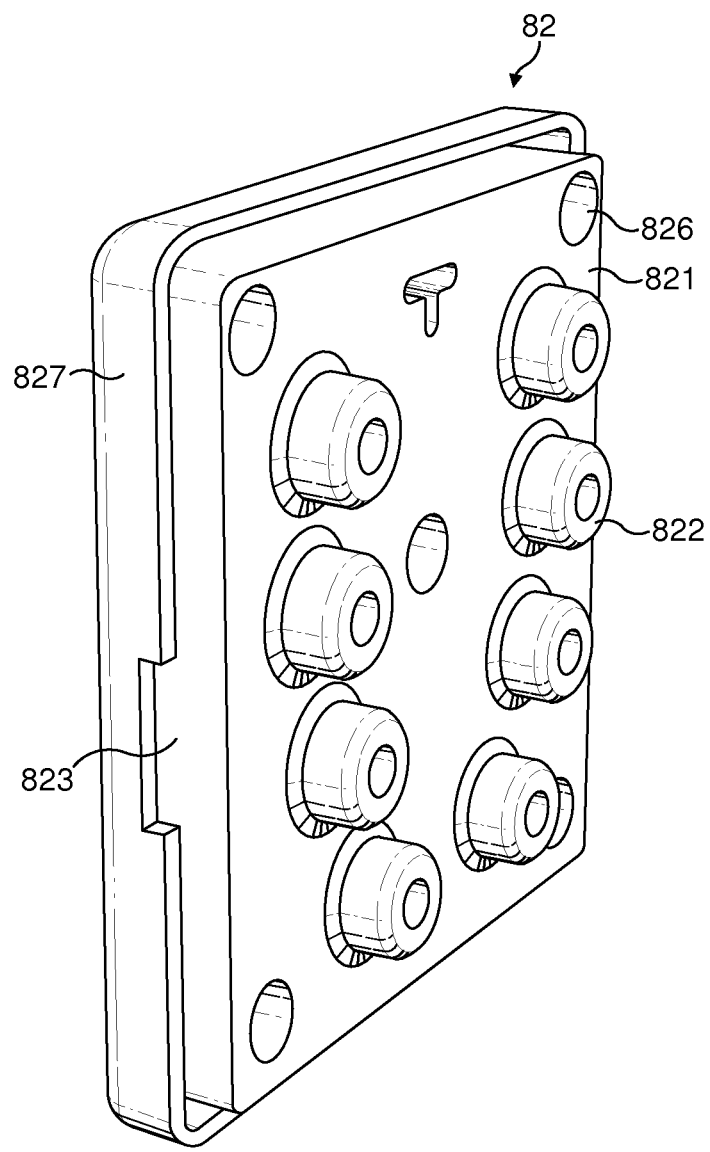
FIGS. 3 and 4 showing perspective front and rear view of a resilient support member used in the system of the present invention.

FIG. 3 describes a resilient support member 82 that can be implemented in the present invention. This resilient support member 82 is a flat sheet 823 of a resilient material presenting six parts able to contact the probe means on its side 821 and associated to the circuitry 9 on its other side. On this side 821 all the parts able to contact the probe means present the form of a hollowed cylinder 822 protruding from the sheet 823 of the resilient support member. The diameter of the cylinder is usually adapted to the size of the flange 82 of the pins 81 so that the pins can distribute their force on all the edge of the hollowed cylinder 822.

Figure 4:
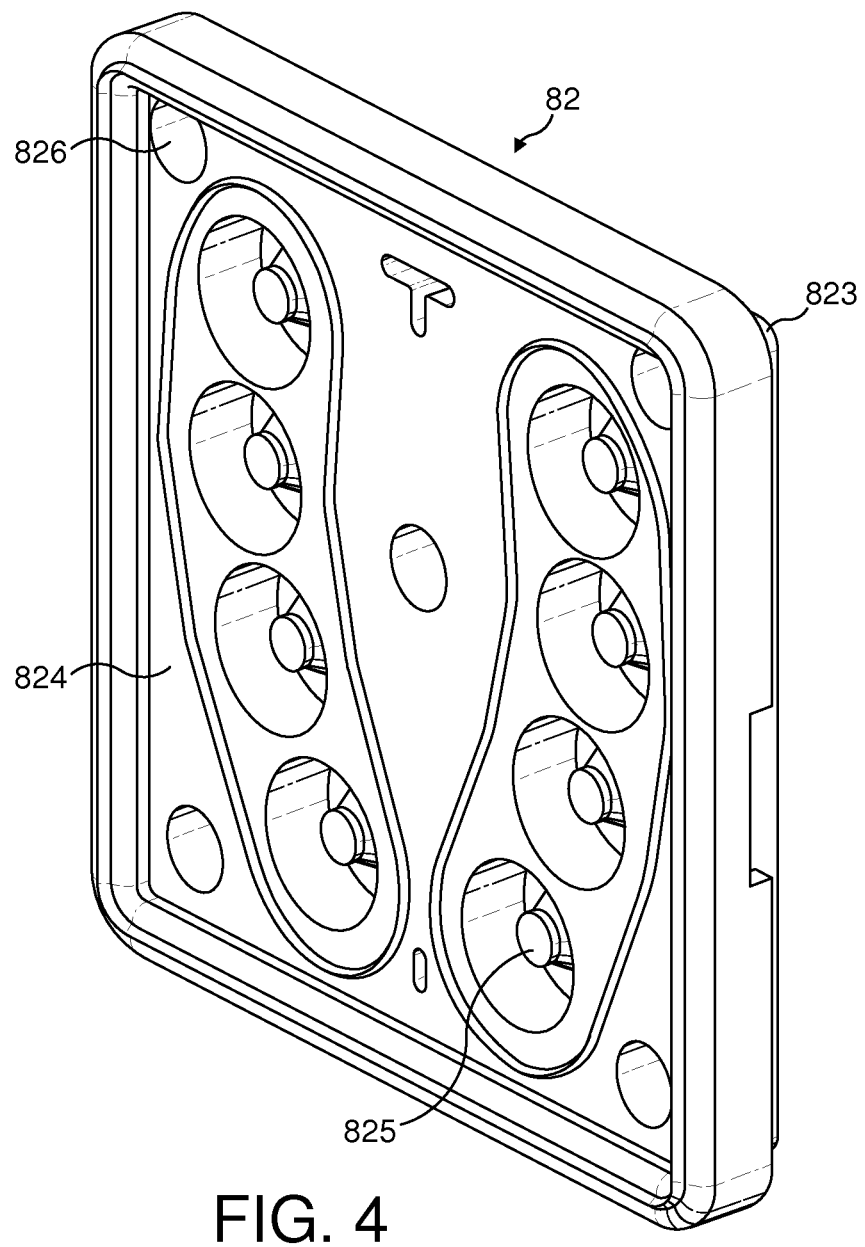

FIG. 4 describes the other side 824 of the same resilient support member 82. On this side the six parts able to be associated to the circuitry 9 all present the form of a cone 825 hollowed out in the flat sheet 823 of the resilient material. Holes 826 in the corners of the flat sheet 823 and a lip 827 around all the edges of the sheet 823 enable the fastening of the resilient support member 82 to the part of the machine receiving the identification member of the capsule.

Figure 6:
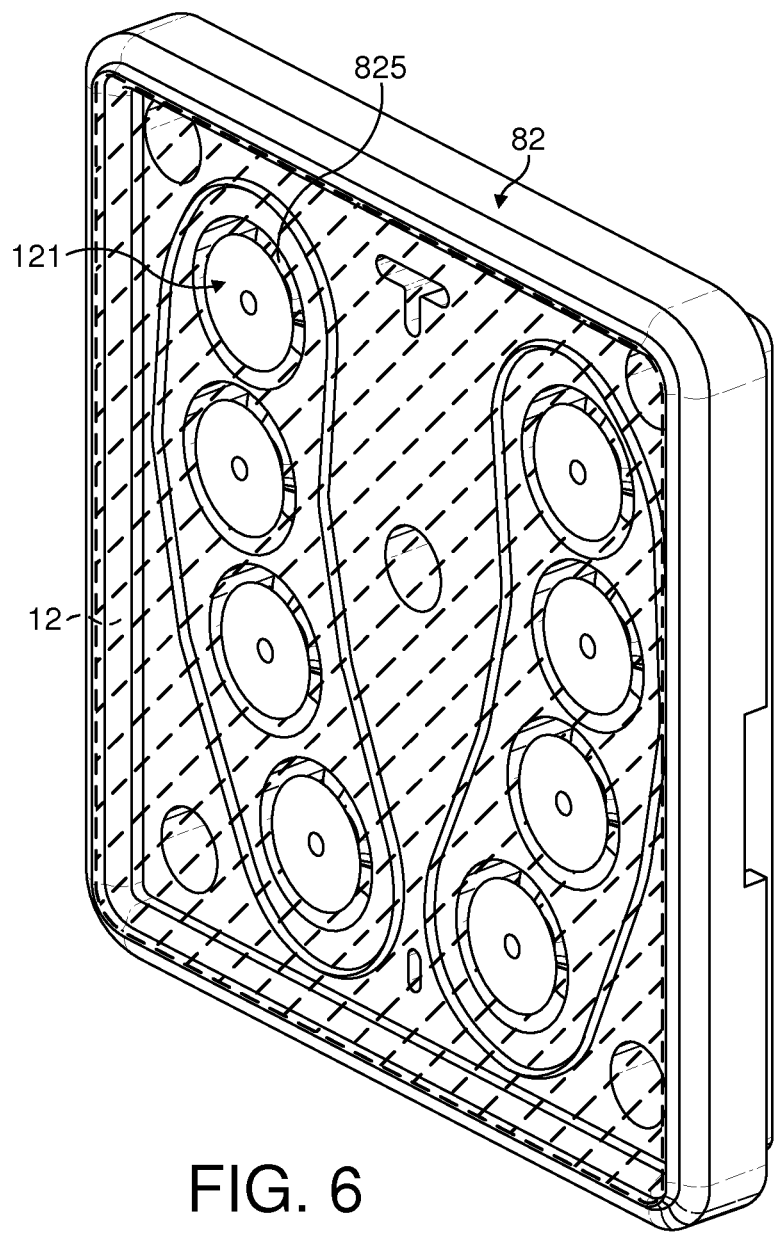
FIG. 6 corresponding to the perspective front view of the resilient support member according to FIG. 4 with associated conductive means.

FIG. 6 illustrates the positioning of the discrete conductive parts 121 placed between the resilient support member 82 and the circuitry. The movements of the cones 825 induce the movements of these conductive pieces 121 and their contact with the areas of the circuitry that can be short-circuited. These discrete conductive parts 121 are fixed on a layer 12 (illustrated in dotted points) placed between the resilient support member 82 and the circuitry; the discrete conductive parts are fixed on the side of the layer facing the circuitry so as to be able to contact the circuitry.

FIGS. 5a, 5b, 5c and 5d are longitudinal sections of the resilient support means 82 illustrating how one of the six parts of the resilient support member in contact with the probe deforms when it is submitted to the force of the probes 81.

Figure 5A:
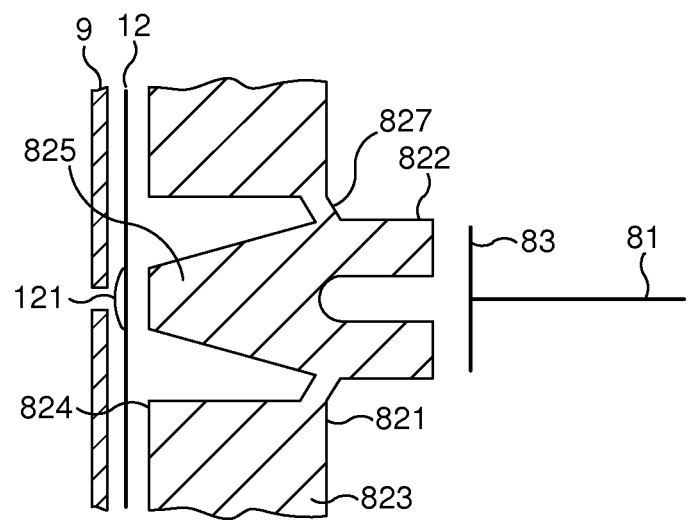
FIGS. 5a, 5b, 5c, 5d illustrating how the resilient support member deforms when it is submitted to the force of the probes.

FIG. 5a shows the resilient support member at rest: on the side 821 facing the probe means the hollowed cylinder 822 protruding from the flat sheet 823 of the resilient support member does not contact the probe means represented by a pin 81 with a flange 83. On the side 824 facing the electrically conducting layer 12, the cone 825 does not press the conducting layer 12, 121 against the printed circuit board 9.

Figure 5B:
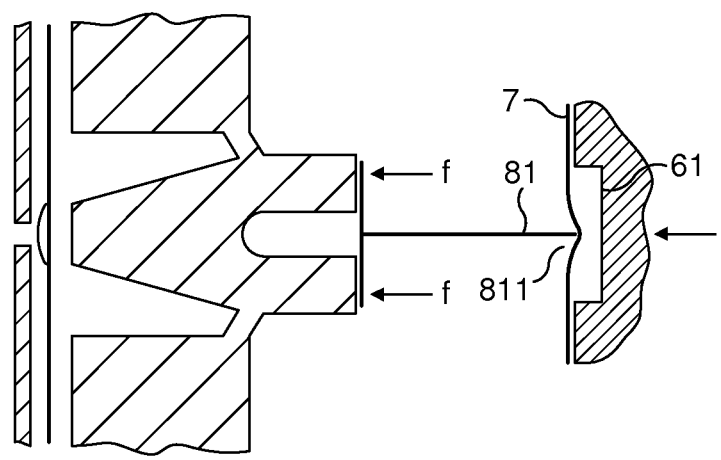

FIG. 5b shows the resilient support member when it is contacted by probe means 81 when said probe means begin to enter into contact with the identification member 6 covered by the cover 7. In this figure, the probe means 81 faces a hole 61 in the identification member 6. Due to the sharp end 811 of the tip of the probe means 81, only a small force is necessary to pierce the cover 6 above the hole 61 further to the movement of the identification member 6 from the right to the left side. The force f on the extremities of the hollowed cylinder 822 is not strong enough to deform the resilient support member.

Figure 5C:
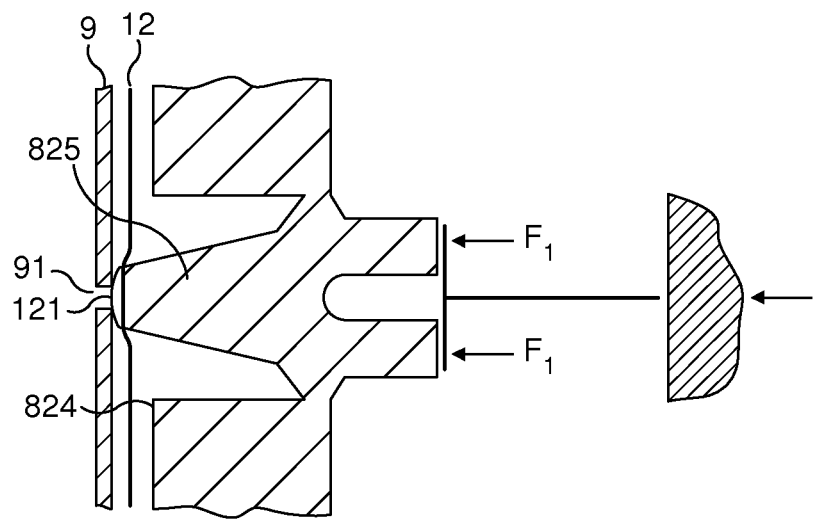

FIG. 5c shows the resilient support member when it is contacted by probe means 81 when said probe means 81 does not face a hole 61 in the identification member 6. The movement of the identification member 6 from the right to the left side induces a force F that is greater than the force f applied in FIG. 5b. This force $F_1$ creates a longitudinal movement of the cone 825 which pushes the layer 12 and its electrical conductive part 121 against the printed circuit board 9 at the level of the area 91 which is short-circuited, then an electric contact can be made in the printed circuit board 9.

Figure 5D:
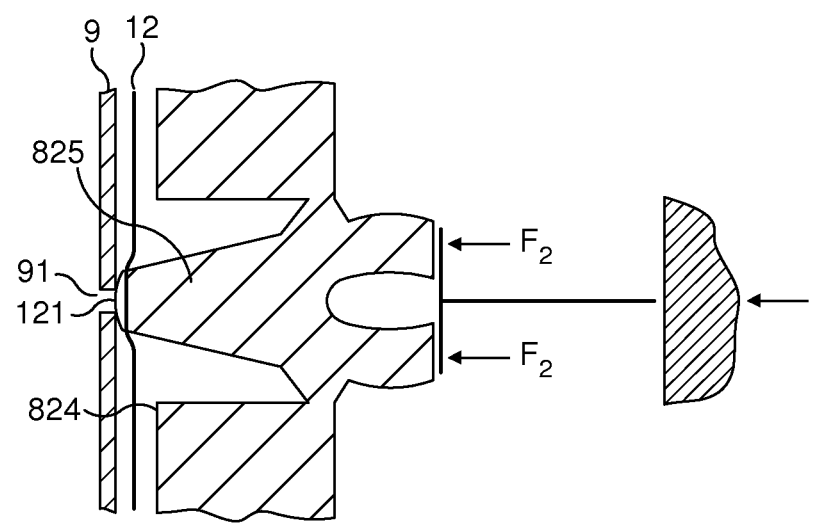

FIG. 5d shows the resilient support member 82 when it is contacted by probe means 81 when said probe means 81 does not face a hole 61 in the identification member 6 and when an important force $F_2$ must be applied to the resilient support member 82 for example in the case where the identification member comprises few holes. This important force $F_2$ deforms transversally the hollowed cylinder 822. Then contrary to the prior art, the resilient support member does not resist to the force and the identification member is not folded.

It can be noticed that at rest—that is when no force is applied on the resilient support member 82 (as represented in FIGS. 5a and 5b)—at the connection 827 of the hollowed cylinder 822 and the cone 825, the sheet is inclined in direction of the hollowed cylinder. Due to this inclination, when the force $F_1$, $F_2$ applied on the resilient support member 82 (as represented in FIGS. 5a and 5b) stops, the cone immediately comes back to its position at rest according to FIG. 5a.

The invention allows the application of an important force on the capsule identification member without folding it due to the dissipation of a part of the force according to a direction transveral to the force direction.

The invention claimed is:

1. A beverage production system comprising:
   beverage ingredient containing capsules comprising an identification member; and
   a beverage production machine for receiving the capsules, the machine comprising a contact member for physically contacting the capsule identification member in order to read information thereof, and a controller connected to the contact member and designed to control the operation of the beverage production machine in response to the read information, the contact member comprising:
   at least one displaceable probe which mechanically contacts the capsule identification member, and
   a resilient support member in contact with the probe on one side and associated to a circuitry on its other side, at least a part of the resilient support member in contact with the probe on one side and associated to the circuitry on its other side presents a shape able to deform itself when the probe applies a force on it, the deformation being partially transversal to the direction applied by the force, and the resilient support member being a sheet on which a hollowed cylinder protrudes from the side of the resilient support member in contact with the probe, and in which a hollow cone extends coaxially with the hollowed cylinder on the other side of the resilient support member which contacts the circuitry when the resilient support member is deformed.

2. The beverage production system according to claim 1, wherein the part of the resilient support member in contact with the probe presents a shape that when the probe applies a force on it, it first deforms itself along a direction longitudinal to the force applied by the probe and second deforms itself along a direction transversal to the direction applied by the force.

3. The beverage production system according to claim 1, wherein the resilient support member is made of an elastomeric material.

4. The beverage production system according to claim 3, wherein the resilient support member is made of silicone or of an EPDM rubber.

5. The beverage production system according to claim 1, wherein the contact member comprises discrete conductive parts fixed on a layer placed between the resilient support member and the circuitry.

6. The beverage production system according to claim 5, wherein the discrete conductive parts are fixed on the side of the layer facing the circuitry.

7. The beverage production system according to claim 6, wherein the discrete conductive parts face the areas of the circuitry which can be short-circuited.

8. The beverage production system according to claim 5, wherein the layer is made of an elastomeric member and the electrical conductive parts are made of graphite.

9. The beverage production system according to claim 5, wherein the layer is a film, the discrete electrical conductive pieces being stuck on the film and a waterproof material layer being placed between the resilient support member and the layer.

10. The beverage production system according to claim 1, wherein the machine comprises a controller arranged with the at least one probe to detect an identification information in relation to the degree of displacement of the probe in response to its contact with the capsule.

11. The beverage production system according to claim 1, wherein the at least one displaceable probe and the part of the resilient support member coupled to the probe are selectively moved depending on the contact of the probe with the capsule and selectively contact the associated circuitry wherein the contact of the probe coupled to the resilient member and the associated circuitry constitutes a predetermined binary coded state (0 or 1) and the non-contact of the probe coupled to the resilient member and the associated circuitry constitutes the other binary coded state (1 or 0).

12. The beverage production system of claim 1, wherein the contact member comprises a plurality of identical displaceable pins for contacting a plurality of predetermined localized contact receivers of the capsule.

* * * * *